United States Patent
Pyo et al.

(10) Patent No.: US 9,075,463 B2
(45) Date of Patent: *Jul. 7, 2015

(54) DISPLAY DEVICE WITH AN INTEGRATED TOUCH SCREEN AND METHOD FOR DRIVING THE SAME

(71) Applicant: LG Display Co., Ltd., Seoul (KR)

(72) Inventors: SeungEun Pyo, Incheon (KR); HongChul Kim, Gunpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 123 days.

This patent is subject to a terminal disclaimer.

(21) Appl. No.: 13/714,053

(22) Filed: Dec. 13, 2012

(65) Prior Publication Data

US 2013/0342479 A1    Dec. 26, 2013

(30) Foreign Application Priority Data

Jun. 20, 2012    (KR) .......................... 10-2012-0065946

(51) Int. Cl.
*G06F 3/045* (2006.01)
*G06F 3/041* (2006.01)
*G06F 3/044* (2006.01)
*G09G 3/00* (2006.01)

(52) U.S. Cl.
CPC ............... *G06F 3/041* (2013.01); *G06F 3/0412* (2013.01); *G06F 3/044* (2013.01); *G09G 3/00* (2013.01)

(58) Field of Classification Search
CPC ..... G06F 3/0412; G06F 3/044; G06F 3/0416; G06F 3/041
USPC .................................. 345/103, 104, 173, 174
See application file for complete search history.

(56) References Cited

U.S. PATENT DOCUMENTS

| | | | |
|---|---|---|---|
| 5,392,058 A | * | 2/1995 | Tagawa .................... 345/104 |
| 2010/0194707 A1 | * | 8/2010 | Hotelling et al. ............ 345/173 |
| 2010/0253638 A1 | * | 10/2010 | Yousefpor et al. ............ 345/173 |

FOREIGN PATENT DOCUMENTS

TW    201120720 A1    6/2011

* cited by examiner

*Primary Examiner* — Koosha Sharifi-Tafreshi
(74) *Attorney, Agent, or Firm* — Birch, Stewart, Kolasch & Birch, LLP (57) ABSTRACT

A display device with an integrated touch screen including a panel including electrodes divided into n number of groups, where n is an integer more than or equal to two; a display driver IC configured to apply a common voltage to the n divided groups when a driving mode of the panel is a display driving mode, and to selectively apply a touch scan signal or the common voltage to the n divided groups when the driving mode of the panel is a touch driving mode; and a touch IC configured to generate the touch scan signal to apply the touch scan signal to the display driver IC.

16 Claims, 5 Drawing Sheets

Applying ground voltage to
electrodes of group (related art)

FIG. 5B

Applying common voltage to
electrodes of group (present invention)

DISPLAY DEVICE WITH AN INTEGRATED TOUCH SCREEN AND METHOD FOR DRIVING THE SAME

CROSS-REFERENCE TO RELATED APPLICATIONS

This application claims the benefit of the Korean Patent Application No. 10-2012-0065946 filed on Jun. 20, 2012, which is hereby incorporated by reference as if fully set forth herein.

BACKGROUND OF THE INVENTION

1. Field of the Invention

The present invention relates to a display device, and more particularly, to a display device with an integrated touch screen.

2. Discussion of the Related Art

A touch screen is an input device included in image display devices such as Liquid Crystal Displays (LCDs), Field Emission Displays (FEDs), Plasma Display Panel (PDPs), Electroluminescent Displays (ELDs), and Electrophoretic Display (EPDs). Thus, the user can input information by applying a pressure (e.g., a pressing or touching) to a touch sensor of the touch screen while viewing the image display device. Further, the demand for display devices with an integrated in-cell type touch screen such as smart phones and tablet Personal Computers (PCs) is increasing.

Figure 1:
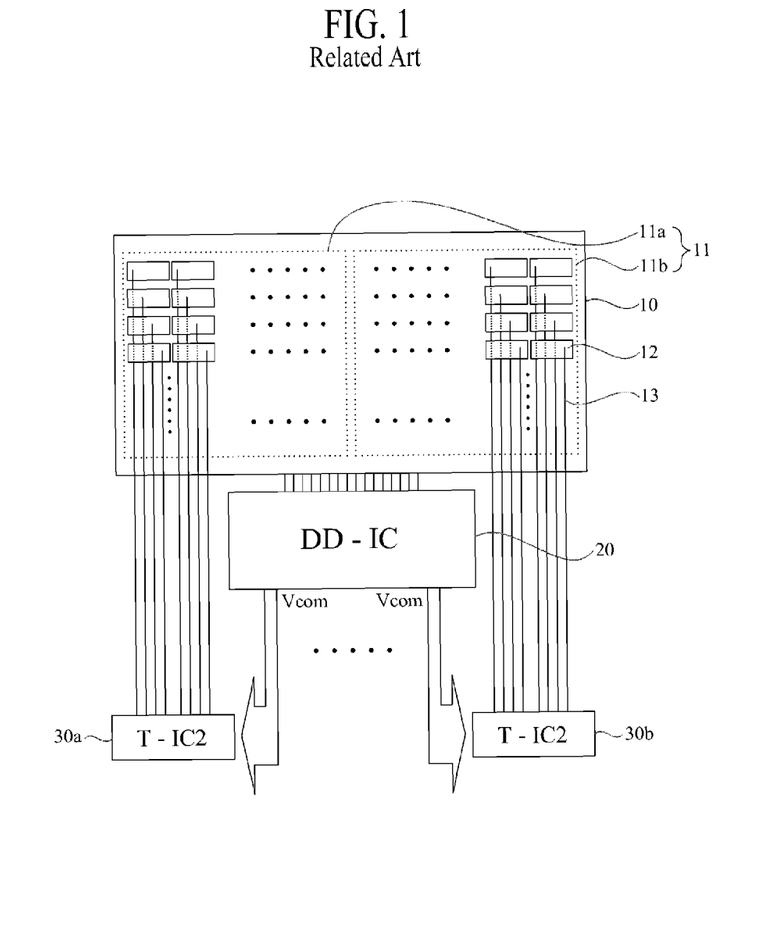
FIG. 1 is a diagram illustrating a related art display device with an integrated touch screen.

Hereinafter, a related art display device with an integrated touch screen will be described with reference to FIG. 1. In more detail, FIG. 1 is a diagram illustrating a related art display device with an integrated touch screen, and particularly illustrates a display device with an integrated self-capacitive touch screen having an in-cell type.

As shown, the related art display device includes a panel 10 that includes two groups 11; a display driver IC (DD-IC) 20 connected to an external system and which controls gate lines and data lines in the panel 10; and touch ICs (T-IC1 and T-IC2) 30a and 30b which drive the two groups 11. Further, each of the two groups 11 includes electrodes 12 and lines 13 respectively extended from the electrodes 12. Each of the touch ICs 30a and 30b includes touch IC channels respectively corresponding to the lines 13 for self-capacitive touch sensing.

In addition, each of the electrodes 12 is built in the panel 10 and performs a touch function and a display function, and thus functions as a common electrode for display driving when the display device is driven in a display driving mode, or as a touch electrode when the display device is driven in a touch driving mode.

Figure 2:
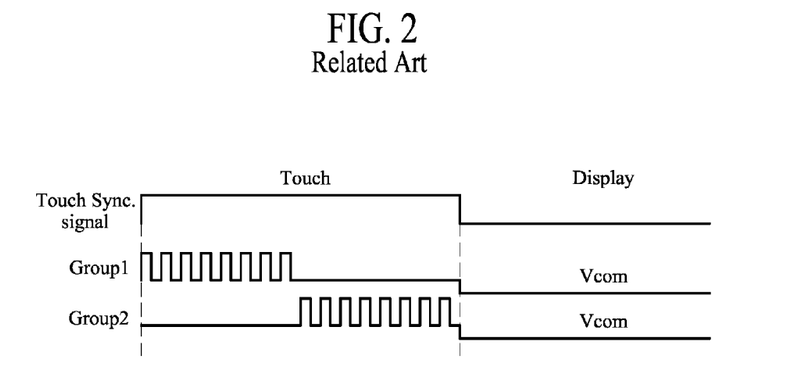
FIG. 2 is a diagram showing signals and voltages applied for the related art driving mode.

Voltages and signals applied by groups according to a driving mode will now be described in detail with reference to FIGS. 1 and 2. When a driving mode of the panel 10 is the display driving mode, a common voltage is applied to the electrodes 12 through the touch ICs 30a and 30b. Thus, the electrodes 12 receive the common voltage and are thereby used as common electrodes for display driving.

When the driving mode of the panel 10 is the touch driving mode, a touch scan signal for touch sensing is applied from the first touch IC 30a to the first group 11a, and a ground-level voltage or a floating voltage is applied from the second touch IC 30b to the second group 11b. Here, the electrodes included in the first group 11a are used as touch electrodes for touch sensing. Then, the touch scan signal for touch sensing is applied from the second touch IC 30b to the second group 11b, and the ground-level voltage or the floating voltage is applied from the first touch IC 30a to the first group 11a. Similarly, the electrodes included in the second group 11b are used as touch electrodes for touch sensing.

On the other hand, assuming a common voltage of about −2V is applied to the electrodes of a group for display driving in the display driving mode, and the ground-level voltage of 0V or the floating voltage is applied to electrodes of a group to which the touch scan signal is not applied in the touch driving mode, there is a drop of a voltage applied to a pixel electrode in the display driving mode and the touch driving mode. Thus, a block dim occurs due to the difference between voltages applied to electrodes of a group.

When the voltage drop is continued for a certain time or more, the liquid crystal is twisted, and thus the grayscale level of the liquid crystal is shifted, causing a flicker phenomenon. Also, in the touch driving mode, because a display driving voltage is not shifted identically to the display driving mode, a voltage formed in a pixel is asymmetrically formed with respect to the ground-level voltage of 0V.

To summarize, the related art display device with an integrated touch screen has the following problems. First, in the display driving mode and the touch driving mode, a block dim occurs in a pixel electrode due to a difference between voltages applied to electrodes of a group. Second, the grayscale level of liquid crystal is shifted due to the drop of a driving voltage, causing flickers. Third, a positive voltage and a negative voltage are asymmetrically formed with respect to the ground-level voltage in a pixel, and thus flickers increase.

SUMMARY OF THE INVENTION

Accordingly, one object of the present invention is to provide a display device with an integrated touch screen and a driving method thereof that substantially obviate one or more problems due to limitations and disadvantages of the related art.

Another object of the present invention is to provide a display device with an integrated touch screen, which can overcome the drawbacks due to a difference between voltages applied to electrodes.

To achieve these and other advantages and in accordance with the purpose of the invention, as embodied and broadly described herein, the present invention provides in one aspect a display device with an integrated touch screen including a panel including electrodes divided into n number of groups, where n is an integer more than or equal to two; a display driver IC configured to apply a common voltage to the n divided groups when a driving mode of the panel is a display driving mode, and to selectively apply a touch scan signal or the common voltage to the n divided groups when the driving mode of the panel is a touch driving mode; and a touch IC configured to generate the touch scan signal to apply the touch scan signal to the display driver IC.

In another aspect, the present invention provides a method of controlling a display device with an integrated touch screen, and which includes dividing a panel of the display device including electrodes into n number of groups, where n is an integer more than or equal to two; applying, via a display driver IC of the display device, a common voltage to the n divided groups when a driving mode of the panel is a display driving mode; selectively applying, via the display driver IC, a touch scan signal or the common voltage to the n divided groups when the driving mode of the panel is a touch driving mode; and generating, via a touch IC of the display device, the touch scan signal to apply the touch scan signal to the display driver IC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, embodiments of the present invention will be described in detail with reference to the accompanying drawings. Wherever possible, the same reference numbers will be used throughout the drawings to refer to the same or like parts.

In a display device with an integrated touch screen according to an embodiment of the present invention, electrodes are divided into n number of groups, and a touch scan signal is sequentially applied to the n groups. However, for convenience, the below description describes the electrodes divided into two groups. However, the present invention is not limited to dividing and driving the electrodes into the two groups. That is, the electrodes may be divided into three, four, five or more groups.

Figure 3:
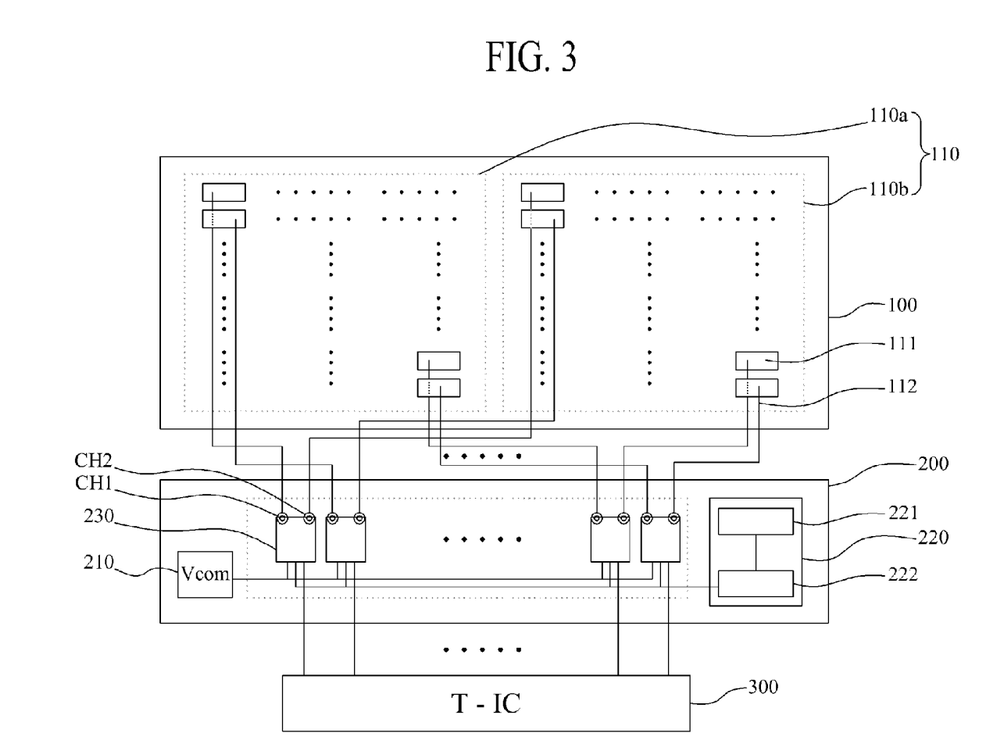
FIG. 3 is a diagram illustrating a display device with an integrated touch screen according to an embodiment of the present invention.

FIG. 3 is a diagram illustrating a display device with an integrated touch screen according to an embodiment of the present invention. As shown, the display device includes a panel 100, a display driver IC 200, and a touch IC 300. A touch screen is also built in the panel 100. In particular, the touch screen detects a touch position of a user. In one example, the touch screen applied to the present invention is an in-cell type touch screen using a self-capacitive type. The self-capacitive touch screen includes electrodes 111 and lines 112 formed in the panel 100.

Further, the panel 100 is a structure where a liquid crystal layer is formed between two substrates. In this example, a lower substrate of the panel 100 includes data lines, gate lines intersecting the data lines, Thin Film Transistors (TFTs) respectively formed in intersection areas between the data lines and the gate lines; pixel electrodes that respectively charge data voltages into pixels, and an electrode that drives liquid crystal injected into the liquid crystal layer together with a pixel electrode. The pixels are arranged in a matrix type corresponding to an intersection structure between the date lines and the gate lines.

Further, the electrodes 111 are formed to overlap with pixel electrodes in the pixel area of the panel 100. In other words, the electrodes 111 are not formed in each pixel but are formed in an area overlapping with pixels.

When the driving mode of the panel 100 is the display driving mode, each of the electrodes 111 operates as a common electrode that drives liquid crystal together with a pixel electrode formed in a corresponding pixel. When the driving mode of the panel 100 is the touch driving mode, each electrode 111 operates as a touch electrode that detects a touch point with the touch scan signal applied from the touch IC 300.

Further, the electrodes 111 are divided into two groups in the panel 100, and are formed in a block type group 110. The number of electrodes included in one group of the block type group 110 is equal to the number of electrodes included in the other group of the block type group 110. When the panel 100 is rectangular in shape, the group 110 is divided in a short side direction of a rectangular shape, and thereby the RC delay between adjacent electrodes included in different groups is reduced, thus enhancing touch sensitivity.

In addition, the lines 112 connect the electrodes 111 and the driver IC 200. Therefore, a common voltage and a touch scan signal output from the display driver IC 200 are applied to the electrodes 111 through the respective lines 112. The number of lines 112 is equal to the number of electrodes 111.

When the driving mode of the panel 100 is the display driving mode, the display driver IC 200 applies the common voltage to the electrodes 111. When the driving mode of the panel 100 is the touch driving mode, the display driver IC 200 divides the electrodes 111 into two groups and applies the touch scan signal or the common voltage to each of the two divided groups. In particular, when the driving mode of the panel 100 is the touch driving mode, the display driver IC 200 sequentially applies the touch scan signal to n number of divided groups, and applies the common voltage to a group to which the touch scan signal is not applied.

Further, the display driver IC 200 drives the data lines and gate lines formed in the panel 100, and allows the electrodes 111 to act as common electrodes or touch electrodes. In FIG. 3, the display driver IC 200 includes a common voltage generation unit 210, a control unit 220, and a switching unit 230. In more detail, the common voltage generation unit 210 generates and applies the common voltage Vcom to the switching unit 230. Specifically, when the driving mode of the panel 100 is the display driving mode, the common voltage generation unit 210 generates the common voltage to be applied to the electrodes 111 for image output, and applies the common voltage to the switching unit 230.

In addition, the control unit 220 includes a sync controller 221 that generates a sync signal indicating the driving mode of the panel 100, and a switching controller 222 that generates a switching control signal. For example, as illustrated in FIG. 3, when the driving mode of the panel 100 is the display driving mode, the sync controller 221 generates the synch signal that allows the common voltage Vcom generated by the common voltage generation unit 210 to be applied to the electrodes 111 through the switching unit 230. When the driving mode of the panel 100 is the touch driving mode, the sync controller 221 generates the synch signal that allows the touch scan signal generated by the touch IC 300 to be applied to the electrodes 111.

Further, the switching controller 222 generates a control signal that allows the electrodes 111 to be simultaneously connected to the common voltage generation unit 210 or allows the electrodes 111 to be sequentially connected to the touch IC 300 by groups, and allows a group not connected to the touch IC 300 to be connected to the common voltage generation unit 210, according to the sync signal generated in the control unit 220.

To summarize the above-described operation of the control unit 220, when the driving mode of the panel 100 is the display driving mode, the sync controller 221 generates a synch signal that indicates the display driving mode, and the switching controller 222 generates a control signal that allows the common voltage applied from the common voltage generation unit 210 to be simultaneously applied to the electrodes 111 according to the generated sync signal.

When the driving mode of the panel 100 is the touch driving mode, the sync controller 221 generates a synch signal that indicates the touch driving mode, and the switching controller 222 generates a control signal that allows the touch scan signal applied from the touch IC 300 to be sequentially applied to the two electrode groups 110, and allows the common voltage applied from the common voltage generation unit 210 to be applied to an electrode group to which the touch scan signal is not applied according to the generated sync signal.

For example, the control signal generated by the switching controller 222 controls the switching unit 230 such that the common voltage generation unit 210 is simultaneously connected to the electrodes 111, or the common voltage generation unit 210 and the touch IC 300 are connected in units of a group 110 according to the sync signal.

In addition, the switching unit 230 connects the two groups and the common voltage generation unit 210, or connects the touch IC 300 and a group selected among from the two groups 110 and connects the common voltage generation unit 210 and a group other than the selected groups according to the switching control signal based on the sync signal from the control unit 220.

For example, as illustrated in FIG. 3, when the sync signal from the sync controller 211 indicates the display driving mode and the switching control signal from the switching controller 222 allows the common voltage to be applied to all the electrodes 111, the common voltage generated by the common voltage generation unit 210 is applied to all the electrodes 111.

On the other hand, when the sync signal from the sync controller 211 indicates the touch driving mode and the switching control signal from the switching controller 222 allows the touch scan signal to be applied to the first group 110a, the touch scan signal generated by the touch IC 300 is applied to the electrodes of the first group 110a through CH1 of the switching unit 230, and the common voltage generated by the common voltage generation unit 210 is applied to the electrodes of the second group 110b through CH2 of the switching unit 230.

Alternatively, when the sync signal from the sync controller 211 indicates the touch driving mode and the switching control signal from the switching controller 222 allows the touch scan signal to be applied to the second group 110b, the touch scan signal generated by the touch IC 300 is applied to the electrodes of the second group 110b through the CH2 of the switching unit 230, and the common voltage generated by the common voltage generation unit 210 is applied to the electrodes of the first group 110a through the CH1 of the switching unit 230.

Finally, the touch IC 300 applies the touch scan signal to the electrodes 111 through the display driver IC 200, and then senses the change in the capacitance of each electrode to determine whether there is a touch on an electrode. The touch IC 300 and the display driver IC 200 are connected through a touch IC channel.

Hereinafter, the forms of signals and voltages applied according to the driving mode of the display device with an integrated touch screen will be described with reference to FIG. 4. In particular, FIG. 4 is a diagram showing signals and voltages applied according to the driving mode of the display device with an integrated touch screen according to an embodiment of the present invention.

Figure 4:
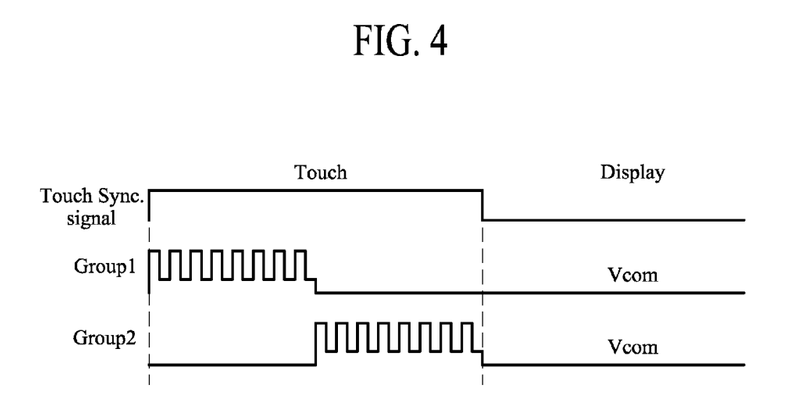
FIG. 4 is a diagram showing signals and voltages applied for the driving mode according to an embodiment of the present invention.

As shown in FIG. 4, when the driving mode of the panel 100 is the touch driving mode, the touch scan signal is applied to Group1, and simultaneously the common voltage is applied to Group2 to which the touch scan signal is not applied. On the other hand, when the touch scan signal is applied to the Group2, the common voltage is applied to the Group1 to which the touch scan signal is not applied. When the driving mode of the panel 100 is the display driving mode, the common voltage is applied to the Group1 and the Group2.

Hereinafter, in the touch driving mode, effects obtained by applying the common voltage instead of the ground-level voltage to the electrodes of a group to which the touch scan signal is not applied will be described with reference to FIGS. 5A and 5B. Also, the voltages of FIGS. 5A and 5B are only examples and are used for describing effects according to an embodiment of the present invention.

Figure 5A:
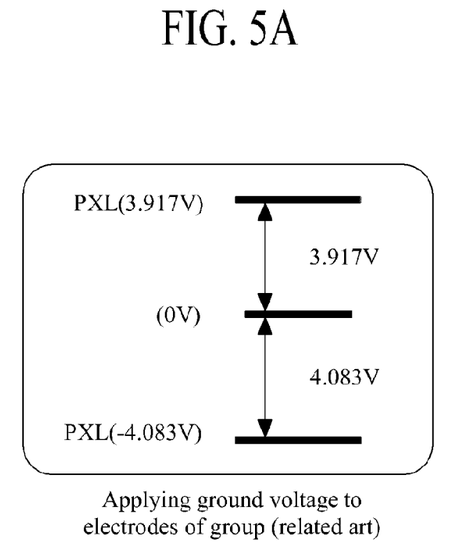
FIGS. 5A and 5B are diagrams showing examples of voltages applied to electrodes of a non-sensing group in the touch driving mode according to an embodiment of the present invention.

In particular, FIG. 5A is a diagram showing a voltage formed in a pixel electrode when a ground voltage is applied to an electrode of a non-sensing group in the touch driving mode of the related art display device. Generally, in the display driving mode, when the common voltage of −2V is applied to the electrode of a group, a voltage of −6V to +2V is formed in a pixel electrode. However, in the touch driving mode, the ground-level voltage of 0V is applied to the electrode of a group. Thus, block dim is caused by a difference between a voltage applied to the electrode of a group in the display driving mode and a voltage applied to the electrode of the group in the touch driving mode.

Moreover, in the touch driving mode, when the ground-level voltage of 0 V is applied to a group to which the touch scan signal is not applied, a voltage of −4V to +4V is required to be formed in a pixel electrode. However, a voltage drops by about 0.83 mV due to a difference between a voltage formed in a pixel electrode in the display driving mode and a voltage formed in the pixel electrode in the touch driving mode, causing flickers. Moreover, a voltage formed in a pixel electrode is asymmetrically formed with respect to the ground-level voltage, and thus, flickers increase.

Figure 5B:
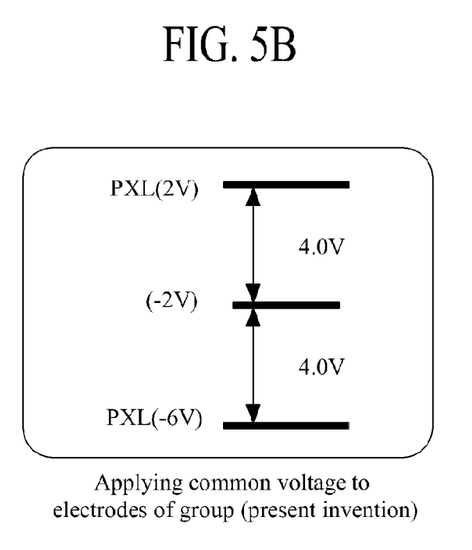

FIG. 5B is a diagram showing a voltage formed in a pixel electrode when the common voltage is applied to an electrode of a non-sensing group in the touch driving mode of the display device with an integrated touch screen according to an embodiment of the present invention.

As shown in FIG. 5B, in the touch driving mode, when the common voltage of −2V is applied to a group to which the touch scan signal is not applied, there is no difference between a voltage applied to the electrode of a group in the display driving mode and a voltage applied to the electrode of the group in the touch driving mode, and thus block dim is prevented. Also, a voltage of −6V to +2V is formed in a pixel electrode, and thus a voltage is not dropped independent of a difference between a voltage formed in a pixel electrode in the display driving mode and a voltage formed in the pixel electrode in the touch driving mode. Furthermore, a voltage formed in a pixel electrode is symmetrically formed with respect to the ground-level voltage, and the above-described drawbacks can be overcome.

A driving method of the display device with an integrated touch screen according to an embodiment of the present invention will now be described in detail with reference to FIG. 3.

First, when the driving mode is the display driving mode, the sync controller 221 of the control unit 220 generates a sync signal indicating the display driving mode, and the switching controller 222 of the control unit 220 transfers a switching control signal generated for the display driving mode to the switching unit 230 according to the sync signal from the sync controller 221. In addition, the switching control signal generated for the display driving mode is a control signal that allows the common voltage to be applied to the electrodes of the two groups 110.

In addition, the switching unit 230 is switched to connect the common voltage generation unit 210 and the electrodes of the two divided groups according to the transferred control signal. For example, the common voltage generation unit 210 is connected to the electrodes of the two divided groups 110 through the CH1 and CH2 of the switching unit 230 according to the control signal that allows the common voltage to be applied to the two groups 110.

In addition, the common voltage generated by the common voltage generation unit 210 is applied to the plurality of electrodes 111 through the switching unit 230. For example, when the common voltage generation unit 210 is connected to the electrodes of the two divided groups 110 through the CH1 and the CH2, the common voltage generated by the common voltage generation unit 210 is applied to the electrodes of the two groups 110.

When the driving mode of the display device is the touch driving mode, the sync controller 221 of the control unit 220 generates a synch signal indicating the touch driving mode, and the switching controller 222 of the control unit 220 transfers a switching control signal generated for the touch driving mode to the switching unit 230 according to the sync signal from the sync controller 221.

Further, the switching control signal for the touch driving mode is categorized into a control signal that allows the touch scan signal to be applied to the first group 110a and allows the common voltage to be applied to the second group 110b, and a control signal that allows the common voltage to be applied to the first group 110a and allows the touch scan signal to be applied to the second group 110b.

As illustrated in FIG. 3, in the display device with an integrated touch screen, although the electrodes are divided into two groups, the electrodes may be divided into three or more groups depending on the situation. In this way, when the electrodes are divided into the three groups, the control signal allows the touch scan signal to be applied to one of the three groups and allows the common voltage to be applied to the other two groups to which the touch scan signal is not applied.

Further, the switching unit 230 is switched to connect the touch IC 300 and the common voltage generation unit 210 to the electrodes of the two divided groups according to the transferred control signal. For example, the touch IC 300 is connected to the electrodes of the first group 110a through the CH1 of the switching unit 230, and the common voltage generation unit 210 is connected to the electrodes of the second group 110b through the CH2 of the switching unit 230 according to the control signal that allows the touch scan signal to be applied to the first group 110a and allows the common voltage to be applied to the second group 110b.

Moreover, the common voltage generation unit 210 is connected to the electrodes of the first group 110a through the CH1 of the switching unit 230, and the touch IC 300 is connected to the electrodes of the second group 110b through the CH2 of the switching unit 230 according to the control signal that allows the common voltage to be applied to the first group 110a and allows the touch scan signal to be applied to the second group 110b.

Furthermore, the touch scan signal generated by the touch IC 300 is applied to the electrodes of one of the two divided groups 110, and the common voltage generated by the common voltage generation unit 210 is applied to the electrodes of the other group, to which the touch scan signal is not applied, through the switching unit 230.

For example, when the touch IC 300 is connected to the electrodes of the first group 110a through the CH1 of the switching unit 230 and the common voltage generation unit 210 is connected to the electrodes of the second group 110b through the CH2 of the switching unit 230, the touch scan signal generated by the touch IC 300 is applied to the electrodes of the first group 110a, and the common voltage generated by the common voltage generation unit 210 is applied to the electrodes of the second group 110b.

Moreover, when the common voltage generation unit 210 is connected to the electrodes of the first group 110a through the CH1 of the switching unit 230 and the touch IC 300 is connected to the electrodes of the second group 110b through the CH2 of the switching unit 230, the common voltage generated by the common voltage generation unit 210 is applied to the electrodes of the first group 110a, and the touch scan signal generated by the touch IC 300 is applied to the electrodes of the second group 110b.

Next, the display device with an integrated touch screen according to an embodiment of the present invention will be summarized as follows. That is, according to an embodiment of the present invention, the common voltage or the touch scan signal is applied to the electrodes of each group through the switching unit in the touch driving mode, and thus, a voltage having the same level as that of the display driving mode is applied to the electrodes of a non-sensing group in the touch driving mode.

According to the embodiments of the present invention, at least two or more electrode groups for the self-capacitive touch screen are connected to the switching unit, and by applying the common voltage or the touch scan signal to the electrodes of each group in the touch driving mode, a voltage having the same level as that of the display driving mode is applied to the electrodes of the non-sensing group in the touch driving mode, thus preventing block dim and flickers.

Moreover, according to the embodiments, the present invention can prevent flickers that appear when a positive voltage and a negative voltage are asymmetrically formed with respect to the ground-level voltage in a pixel electrode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device with an integrated touch screen, comprising:
 a panel including electrodes divided into n number of groups, wherein n is an integer more than or equal to two;
 a display driver IC configured to:
 apply a common voltage of a first level to the n divided groups, when a driving mode of the panel is a display driving mode, and sequentially select at least one of the n divided groups and apply a touch scan signal to the at least one selected group, while applying the common voltage of the first level to unselected n divided groups, when the driving mode of the panel is a touch driving mode; and a touch IC configured to generate the touch scan signal to apply the touch scan signal to the display driver IC, wherein the display driver IC includes a switching unit configured to apply the touch scan signal from the touch IC to the at least one selected group, while applying the common voltage of the first level to the unselected n divided groups, during the touch driving mode.

2. The display device of claim 1, wherein when the driving mode is the touch driving mode, the display driver IC is further configured to apply the common voltage of the first level to a group to which the touch scan signal is not applied.

3. The display device of claim 1, wherein the display driver IC comprises:
a common voltage generation unit configured to generate the common voltage of the first level; and
a control unit configured to generate a sync signal that indicates the driving mode of the panel, and a control signal configured to control the switching unit to connect each of the n divided groups with either the common voltage generation unit or the touch IC.

4. The display device of claim 3, wherein the control unit comprises:
a sync controller configured to generate the sync signal; and
a switching controller configured to generate the control signal.

5. The display device of claim 4, wherein the switching controller is configured to generate the control signal according to the sync signal.

6. The display device of claim 1, wherein the common voltage of the first level applied during the display driving mode and the touch driving mode is not a ground voltage.

7. The display device of claim 1, wherein the touch scan signal includes a voltage signal of a second level.

8. The display device of claim 7, wherein the first level is lower than the second level.

9. A method of controlling a display device with an integrated touch screen, a panel of the display device including electrodes divided into n number of groups, wherein n is an integer more than or equal to two, the method comprising:
applying, via a display driver IC of the display device, a common voltage of a first level to the n divided groups, when a driving mode of the panel is a display driving mode;

sequentially selecting at least one of the n divided groups and applying, via the display driver IC, a touch scan signal to the at least one selected group, while applying the common voltage of the first level to unselected n divided groups, when the driving mode of the panel is a touch driving mode; and generating, via a touch IC of the display device, the touch scan signal to apply the touch scan signal to the display driver IC, wherein the touch scan signal is applied from the touch IC, via a switching unit included in the display driver IC, to the at least one selected group, while the common voltage of the first level is applied, via the switching unit, to the unselected n divided groups, during the touch driving mode.

10. The method of claim 9, wherein when the driving mode is the touch driving mode, the sequentially selecting comprises applying the common voltage of the first level to a group to which the touch scan signal is not applied.

11. The method of claim 9, wherein the display driver IC comprises:
a common voltage generation unit configured to generate the common voltage of the first level; and
a control unit configured to generate a sync signal that indicates the driving mode of the panel, and a control signal configured to control the switching unit to connect each of the n divided groups with the common voltage generation unit or the touch IC respectively.

12. The method of claim 11, wherein the control unit comprises:
a sync controller configured to generate the sync signal; and
a switching controller configured to generate the control signal.

13. The method of claim 12, wherein the switching controller generates the control signal according to the sync signal.

14. The method of claim 9, wherein the common voltage of the first level applied during the display driving mode and the touch driving mode is not a ground voltage.

15. The method of claim 9, wherein the touch scan signal includes a voltage signal of a second level.

16. The method of claim 15, wherein the first level is lower than the second level.

* * * * *